United States Patent [19]

Crawford et al.

[11] Patent Number: 4,759,526
[45] Date of Patent: Jul. 26, 1988

[54] DYNAMOELECTRIC MACHINE MOUNTING ASSEMBLY

[75] Inventors: Brad A. Crawford, American Township, Allen County; Kenneth T. Rice, Lima, both of Ohio

[73] Assignee: A. O. Smith Corporation, Milwaukee, Wis.

[21] Appl. No.: 844,431

[22] Filed: Mar. 26, 1986

[51] Int. Cl.$^4$ ........................................ F16M 13/00
[52] U.S. Cl. .................................... 248/604; 248/674; 310/89; 310/91
[58] Field of Search .................... 310/91, 89, 40.5, 51; 248/603, 604, 614, 674, 675; 220/314, 320, 322, 323

[56] References Cited

U.S. PATENT DOCUMENTS

| | | | |
|---|---|---|---|
| 1,739,082 | 12/1929 | Simmons | 310/91 |
| 2,936,140 | 5/1960 | Copeland | 248/604 |
| 3,065,941 | 11/1962 | Loftis | 248/604 |
| 3,740,599 | 6/1973 | Dochterman | 310/52 |
| 3,773,285 | 11/1973 | Morrill | 248/603 |
| 3,848,837 | 11/1974 | Dochterman | 310/91 |
| 4,200,257 | 4/1980 | Litch, III | 248/604 |
| 4,597,555 | 7/1986 | Weihsmann | 248/675 |

FOREIGN PATENT DOCUMENTS

| | | | |
|---|---|---|---|
| 0717857 | 9/1965 | Canada | 248/604 |
| 2334227 | 11/1976 | France | 310/51 |
| 0648084 | 12/1950 | United Kingdom | 310/91 |

Primary Examiner—R. Skudy
Attorney, Agent, or Firm—Andrus, Sceales, Starke & Sawall

[57] ABSTRACT

A dynamoelectric machine mounting assembly is provided with a plurality of adaptors positioned at spaced locations adjacent to the perimeter of a generally cylindrical frame of a dynamoelectric machine having a central axis. At least one end of each of the adaptors is attached to the frame and a band encircles the frame and the adaptors and exerts a radially inward force on the adaptors. Means are provided for connecting the band to an external structure. By mounting the adaptors on the frame such that one end of each adaptor is radially spaced from the frame, a tapered gap is formed between that end of the adaptor and the frame such that when the adaptor is subjected to a radially inward force from the band, the central portion of the adaptor can deform radially inward without contacting the periphery of the machine frame.

16 Claims, 3 Drawing Sheets

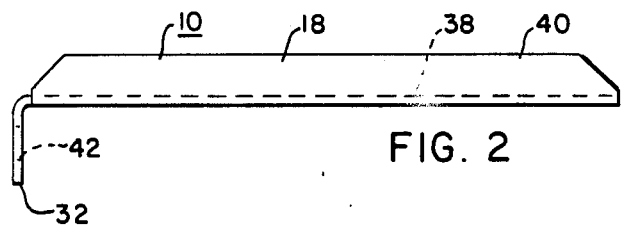
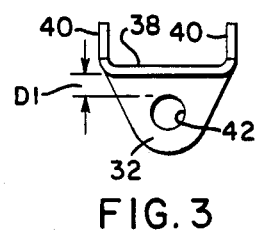
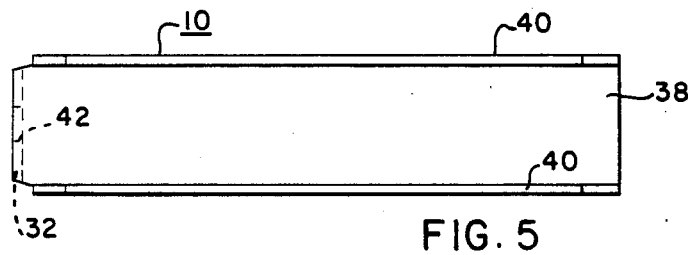
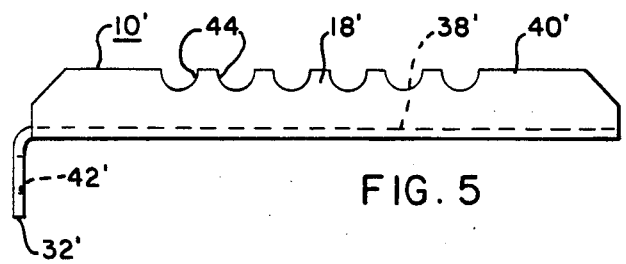
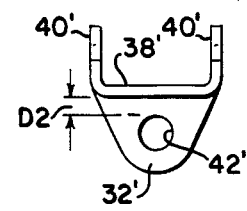
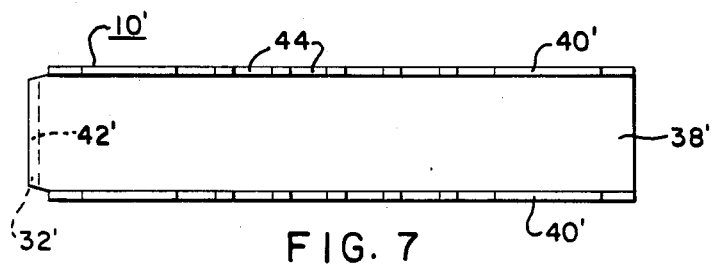

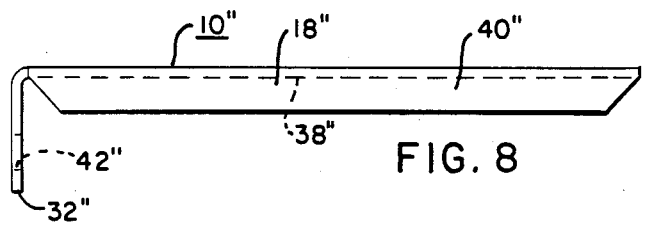
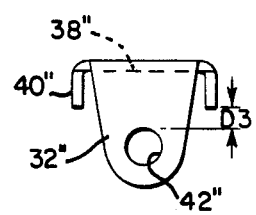
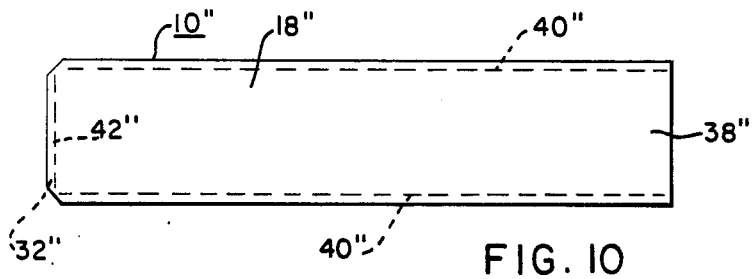
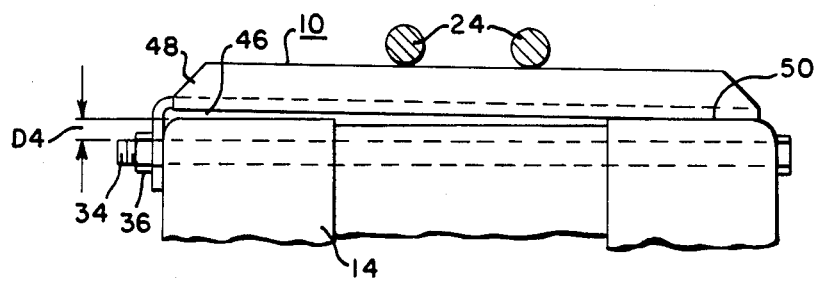
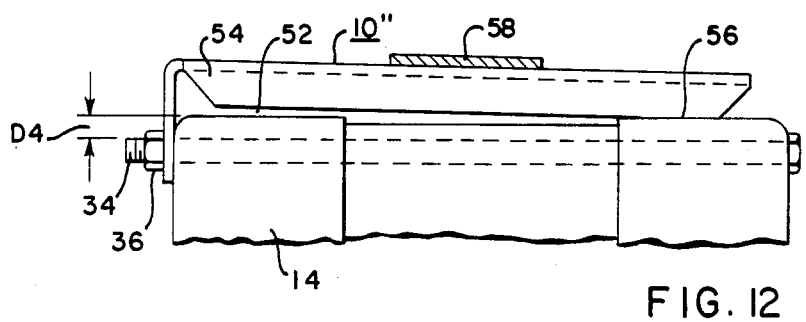

DYNAMOELECTRIC MACHINE MOUNTING ASSEMBLY

BACKGROUND OF THE INVENTION

This invention relates to dynamoelectric machine mounting arrangements and more particularly to such arrangements which are configured to accommodate dynamoelectric machines of different frame sizes while using a band mount which is particularly adapted for one of the frame sizes.

Dynamoelectric machines, such as electric motors used in blower applications, must be mounted in a particular position relative to a driven device. To maintain this position, numerous mounting systems have been developed. One such system includes a band, commonly called a belly band, which encircles the frame of the motor and is attached by mounting arms to a support structure. Such bands may be in the form of hoop or ring shaped flat straps or hoop or ring shaped wires, commonly referred to as wire forms.

It is sometimes desirable to use a motor having a particular frame size in place of a motor having a larger frame size, in a mounting assembly which was designed to accommodate the larger frame size. In a band mount application, where a smaller motor is to be mounted in an assembly that utilizes a band which was designed to accommodate a larger motor, some type of modification is required so that the band can provide the required motor support. One such modification involves the use of a circular steel channel which is designed to fit the circumference of the smaller motor and to have an effective outside diameter which is equal to that of the larger motor. The motor is then supported by placing the circular steel channel between the motor and the band and tightening the band. However, the relatively high cost of the circular steel channel tends to significantly reduce the savings resulting from the use of a smaller motor. It is therefore desirable to design a dynamoelectric machine mounting arrangement which provides a relatively low cost assembly that is capable of permitting the use of a smaller motor with a mounting band which was particularly designed for a larger motor.

SUMMARY OF THE INVENTION

The present invention seeks to provide a dynamoelectric machine mounting assembly in which a mounting band which was designed to accept a motor of a first diameter is used to support a motor of a second and smaller diameter. Such a mounting assembly, when constructed in accordance with the present invention, includes a plurality of adaptors which are positioned at spaced locations adjacent to the perimeter of a generally cylindrical frame of a dynamoelectric machine, having a central axis. Each of the adaptors includes a first portion which lies adjacent to the generally cylindrical frame of the machine such that a mounting band which encircles the frame and the adaptors exerts a radially inward force on the adaptors thereby preventing movement of the machine with respect to the band. Means are provided for connecting the band to an external support structure, such as a blower housing. In the preferred embodiment, the adaptors are attached to the dynamoelectric machine frame such that a first end of the adaptors is radially spaced from the frame and a second end of the adaptors contacts the frame. This provides a tapered gap between at least a portion of the adaptors and the machine frame and permits some degree of radial deformation of the adaptors when the band is tightened to exert and inward force on the adaptors.

BRIEF DESCRIPTION OF THE DRAWINGS

FIGS. 2, 3 and 4 are side, end and top views of an adaptor used in the assembly of FIG. 1;

FIGS. 5, 6 and 7 are side, end and top views of an alternative embodiment of an adaptor which may be used in the assembly of FIG. 1;

FIGS. 8, 9 and 10 are side, end and top views of another alternative embodiment of a spacer which may be used in the assembly of FIG. 1;

FIG. 11 is a side view of the adaptor of FIGS. 2, 3 and 4 mounted on an electric motor; and FIG. 12 is a side view of the adaptor of FIGS. 8, 9 and 10 mounted on an electric motor in accordance with yet another alternative embodiment of the present invention.

DESCRIPTION OF THE PREFERRED EMBODIMENTS

Figure 1:
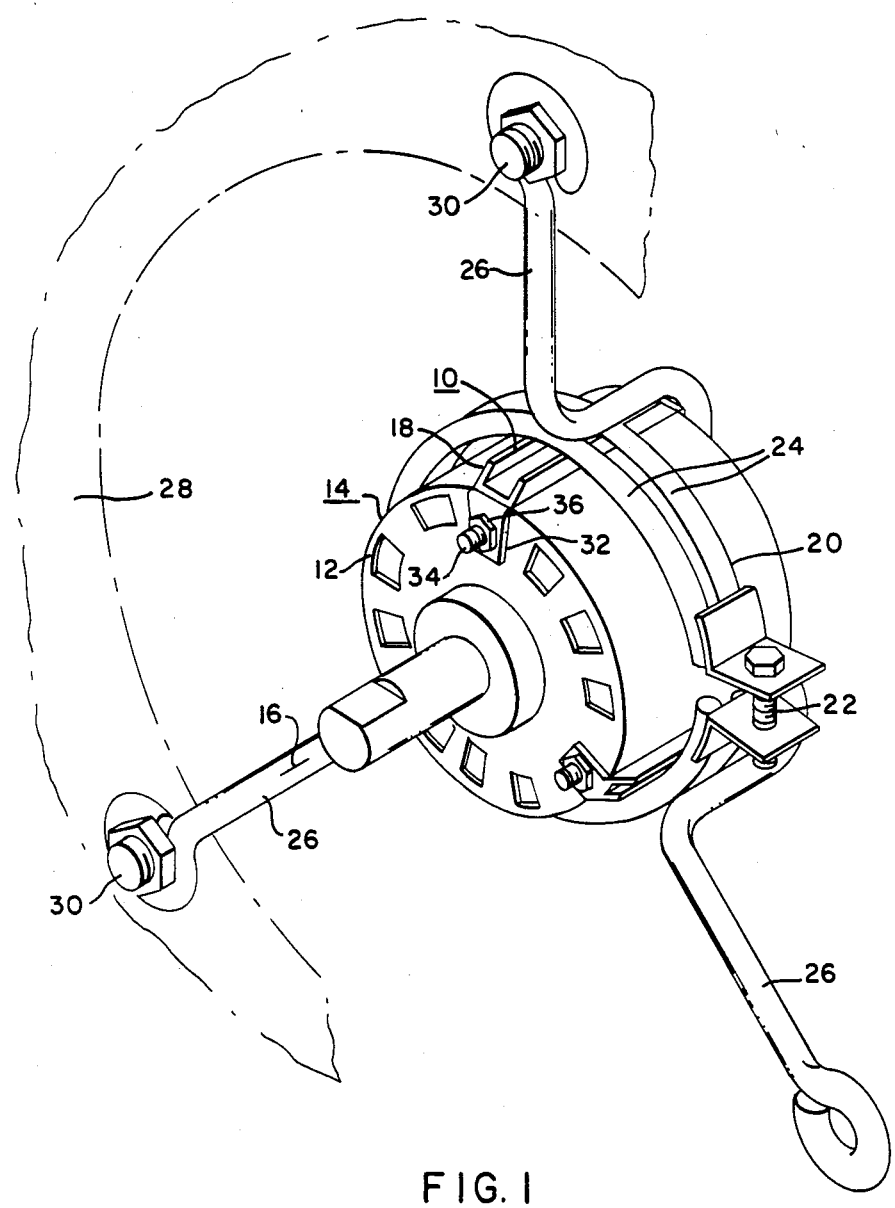
FIG. 1 is a perspective view of a dynamoelectric machine mounting assembly constructed in accordance with one embodiment of the present invention.

Referring to the drawings, FIG. 1 is a perspective view of a dynamoelectric machine mounting assembly constructed in accordance with one embodiment of the present invention. In this view, a plurality of spacers or adaptors 10 are seen to be positioned at space locations adjacent to a frame 12 of a dynamoelectric machine 14 having a central axis 16. Each of the adaptors 10 includes a first portion 18 which is elongated and extends longitudinally along the frame of the machine. A mounting band 20 is seen to encircle the adaptors and the machine frame and can be tightened by a tightening means 22 in order to exert a radially inward force on the adaptors, thereby preventing movement of the machine with respect to the band. Although the band 20 in this embodiment is shown to be comprised of a pair of hoops or ring shaped wires 24, it should be understood that various other types of mounting bands, which are known in the art, may also be used in the assemblies of this invention. Mounting arms 26 are connected to the band 20 and fixed to an external support structure 28, which may be a blower housing, by way of bolts 30. These mounting arms therefore serve as means for connecting the band to an external structure. Each of the adaptors 10 in the assembly of FIG. 1 includes a tab 32 which is bent at a 90° angle with respect to the one end of the first portion 18 of the adaptor and includes an aperture for receiving a bolt 34 which extends longitudinally into and through the motor frame. Nuts 36 are tightened to attach the adaptors to the frame.

FIGS. 2, 3 and 4 are side, end and top views of one of the adaptors used in the assembly of FIG. 1. The first, or longitudinal, portion 18 is seen to have a generally U-shaped cross section formed by a base portion 38 and a pair of sides 40 which extend in a generally radially direction, when used in the assembly of FIG. 1, from the edges of base portion 38. The aperture 42 in tab 32 is configured to receive the through bolts 34 shown in FIG. 1. This aperture is spaced a distance D1 from the base 38 of the longitudinal portion 18 of the adaptor.

FIGS. 5, 6 and 7 show side, end and top views of an alternative embodiment of an adaptor which may be used in the assembly of FIG. 1. In order to simplify the descriptions of the subsequently described alternative embodiments, primed and doubled primed numbers have been used such that similar numbers refer to corresponding portions of the alternative structures. Therefore, the adaptor of FIGS. 5, 6 and 7 can be seen to be similar to the adaptor of FIGS. 2, 3 and 4 with the principal difference being the presence of a plurality of semicircular cutouts 44 on the tops of side portions 40'. It will be apparent to those skilled in the art that the cutouts 44 are shaped to receive the wire hoops 24 of the band 20 of FIG. 1. By providing a plurality of cutouts, the axial position of the machine can be easily adjusted in relatively small increments determined by the separation distance of the cutouts. In FIG. 6, the distance between aperture 42' and the base portion 38' of the longitudinal portion of the adaptor is designated as D2.

FIGS. 8, 9 and 10 show side, end and top views of yet another alternative embodiment of an adaptor which may be used in the assembly of FIG. 1. In this adaptor 10", the U-shaped cross section of a longitudinal portion 18" is shown to be inverted when compared with the previous two adaptor embodiments since the sides 40" extend radially inward from the base portion 38" of the longitudinal portion of the adaptor. In this embodiment, the distance between the aperture 42" and the longitudinal portion 18" is designated as D3.

FIG. 11 is a side view a spacer or adaptor 10 mounted on a motor having a generally cylindrical frame 14. In this view, the distance between the through bolt 34 and the perimeter of the frame 14 is designated as D4. It should be apparent to those skilled in the art that by making the distance D1 in FIG. 3 between the aperture 42 and the longitudinal portion of the spacer or adaptor larger than a distance D4 in FIG. 11, the one end of the adaptor 10, and particularly the elongated portion 18, at the tab 32 is spaced from the frame 14 and the spacer or adaptor 10 is then inclined with respect to the axis of the machine and a tapered gap 46 is formed between the elongated portion 18 of the adaptor 48 and the frame 14 with the second end 50 of the adaptor 10 contacting with the machine frame near the opposite end of the machine. By mounting the adaptors in the manner shown in FIG. 11 such that one end of each adaptor is radially spaced from the machine frame, the tightening of band assembly 20 in FIG. 1 will result in hoops 24 placing a radially inward force on the adaptor 10 and a certain amount of radial deformation of the adaptor 10 and particularly portion can occur before the central portion of the adaptor is forced into contact with the perimeter of the frame 14. Such a mounting arrangement provides a mounting assembly which is less likely to loosen as a result of fatigue of the component parts.

FIG. 12 is a side view of the spacer of FIGS. 8, 9 and 10 mounted on a dynamoelectric machine having a frame 14. Once again, by making the distance D3 in FIG. 9 greater than the distance D4 in FIG. 12, a tapered gap 52 is formed between a first end 54 of the adaptor 10" and the perimeter of the frame 14 with the other end 56 of the adaptor 10" contacting the frame at a point near the opposite end of the frame. In this embodiment, a flat strap band 58 is illustrated to show that the use of various types of known mounting bands is contemplated within the scope of this invention.

This invention also encompasses a method of mounting a dynamoelectric machine which comprises the step of attached one end of each of a plurality of adaptors to a frame of the dynamoelectric machine by passing a bolt through an aperture in a tab extending from one end of each adaptor and passing the bolt longitudinally into the machine frame so that a portion of each of the adaptors extends longitudinally adjacent to the frame, with one end of that portion being spaced radially from the frame. A band is then positioned around the frame and the adaptors, tightened to exert a radially inward force on the adaptors and attached to an external structure.

Although the present invention has been described in terms of what are at present believed to be its preferred embodiment, it will be apparent to those skilled in the art that various changes may be made without departing from the scope of the invention. It is therefore intended that the appended claims cover such changes.

What is claimed is:

1. A dynamoelectric machine mounting assembly comprising:
   a dynamoelectric machine having a generally cylindrical frame with a central axis;
   a plurality of elongated adaptors positioned at circumferentially spaced locations adjacent to said frame;
   means for attaching each of said elongated adaptors to said frame and having a first end of at least one of said adaptors connected to said frame and radially spaced from said frame and a second end of said one of said adaptors releasably contacting said frame to define a deflectable support;
   a band encircling said frame and said adaptors and exerting a radially inward force on said adaptors between said first and second ends; and
   mounting means for connecting said band to an external structure;
   each of said adaptors includes: first portions extending longitudinally adjacent to said frame and a tab extending from said first end of each of said first portions; and said first portions of each of said adaptors having a generally U-shaped cross section formed by a base portion and a pair of sides extending from opposite edges of said base; and said tab connected to said frame and locating said first end outwardly spaced relation to said frame.

2. A dynamoelectric machine mounting assembly as recited in claim 1, wherein:
   the base portion of each of said adaptors lies generally adjacent to said frame and said sides project outwardly of said frame.

3. A dynamoelectric machine mounting assembly as recited in claim 2, wherein:
   each of said adaptors sides includes a cutout for receiving said band.

4. A dynamoelectric machine mounting assembly as recited in claim 1, wherein:
   the base portion of each of said adaptors lies adjacent to said band and said sides project inwardly toward said frame.

5. A dynamoelectric machine mounting assembly as recited in claim 1, wherein:
   said band exerts sufficient force on said adaptors to deform said adaptors in a radially inward direction.

6. A dynamoelectric machine mounting assembly as recited in claim 1, wherein said band comprises:
   a pair of wires encircling said frame and said adaptors; and
   means for tightening said wires.

7. In combination, comprising:

a dynamoelectric machine having a generally cylinderical frame with a central axis;

a plurality of adaptors positioned at spaced locations adjacent to said frame;

each of said adaptors including a first portion extending generally longitudinally in a direction generally parallel to said central axis and a tab extending from a first end of said first portion;

an aperture in each of said tabs and a plurality of bolts, each of said bolts extending through one of said apertures and into said frame for attaching each of said tabs to said frame;

said first portion of each of said adaptors having a generally U-shaped cross section formed by a base portion and a pair of sides extending from opposite edges of said base;

a band encircling said frame and said adaptors, and exerting a radially inward force on said adaptors; and means for connecting said band to an external structure.

8. The combination of claim 7, wherein the distance between said first portion and said aperture in each of said adaptors is greater than the distance between each of said bolts and the periphery of said frame, thereby producing a gap between said first end of each longitudinal portions of each of said adaptors and said frame.

9. The combination of claim 7, wherein:
the base portion of each of said adaptors lies generally adjacent to said frame and sides project outwardly of said frame.

10. The combination of claim 7, wherein:
each of said adaptors sides includes a cutout for receiving said band.

11. The combination of claim 7, wherein:
the base portion of each of said adaptors lies adjacent to said band and said sides project inwardly toward said frame.

12. The combination of claim 7, wherein:
said band exerts sufficient force on said adaptors to deform said adaptors in a radially inward direction.

13. The combination of claim 7, wherein said band comprises:
a pair of wires encircling said frame and said adaptors; and
means for tightening said wires.

14. A mounting adaptor for a dynamoelectric machine having a cylindrical frame having an outer frame periphery and a plurality of bolts extending longitudinally into one end of the frame at spaced locations near the frame periphery, said adaptor comprising:
a first elongated portion having a generally U-shaped cross section formed by a base and a pair of sides extending from opposite edges of said base; and
a tab extending outwardly from said first portion, said tab having an aperture for receiving a bolt which extends longitudinally into one end of a motor frame, wherein the distance between said first portion and said aperture is greater than the distance between said bolt and the periphery of said motor frame for connecting the adaptor to the frame with a gap between the first portion and the frame at said tab.

15. A mounting adaptor as recited in claim 14, wherein said tab and said sides extend in opposite directions from said base.

16. A mounting adaptor as recited in claim 14, wherein said tab and said sides extend in the same direction from said base.

* * * * *

UNITED STATES PATENT AND TRADEMARK OFFICE
CERTIFICATE OF CORRECTION

PATENT NO. : 4,759,526

DATED : July 26, 1988

INVENTOR(S) : BARD A. CRAWFORD ET AL

It is certified that error appears in the above-identified patent and that said Letters Patent is hereby corrected as shown below:

In the drawing figures, sheet 2 of 3, delete first occurrence of "Fig. 5" and substitute therefor ---Fig. 4---; Col. 3, line 3, delete "doubled" and substitute therefor ---double---; Col. 4, line 12, delete "embodiment" and substitute therefor ---embodiments---; Col. 4, line 42, Claim 1, after "end" insert ---in---.

Signed and Sealed this

Twenty-eighth Day of February, 1989

Attest:

DONALD J. QUIGG

*Attesting Officer*    *Commissioner of Patents and Trademarks*